US007274114B1

(12) United States Patent
Wong

(10) Patent No.: US 7,274,114 B1
(45) Date of Patent: Sep. 25, 2007

(54) INTEGRATED TRACKING VOLTAGE REGULATION AND CONTROL FOR PMUIC TO PREVENT LATCH-UP OR EXCESSIVE LEAKAGE CURRENT

(75) Inventor: Kern W. Wong, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 397 days.

(21) Appl. No.: 10/989,131

(22) Filed: Nov. 15, 2004

(51) Int. Cl.
*H02J 1/00* (2006.01)
*H02J 3/00* (2006.01)

(52) U.S. Cl. .......... 307/72

(58) Field of Classification Search .......... 307/72; 323/266-269
See application file for complete search history.

(56) References Cited

U.S. PATENT DOCUMENTS 4,644,251 A 2/1987 Rathke .......... 323/267
4,675,770 A 6/1987 Johansson .......... 361/18
6,031,362 A * 2/2000 Bradley .......... 323/269

OTHER PUBLICATIONS

Singel Resistor Adjustment for Setting DC Output Voltage of Multiple Series Regulators, Aug. 1, 1987, IBM Technical Disclosure Bulletin, 30, 1325.*

* cited by examiner

*Primary Examiner*—Michael Sherry
*Assistant Examiner*—Carlos Amaya
(74) *Attorney, Agent, or Firm*—Darby & Darby PC; David Chin

(57) ABSTRACT

A tracking and control method and circuit for use in a power management unit integrated circuit (PMUIC) that enables multiple voltage regulator outputs to maintain a same voltage or a ratiometric relation to a reference voltage source. When the reference voltage source is powered down or falls below a prescribed level, the tracking power supplies are automatically switched to their internal bandgap reference voltage. Accordingly, outputs of the tracking power supplies are prevented from introducing large transient excursions that might result in malfunctions in the circuitry of the load such as latch-ups. Ratiometric tracking further provides coordinated preservation of logic interface levels, and reduces leakage current.

20 Claims, 5 Drawing Sheets

INTEGRATED TRACKING VOLTAGE REGULATION AND CONTROL FOR PMUIC TO PREVENT LATCH-UP OR EXCESSIVE LEAKAGE CURRENT

FIELD OF THE INVENTION

The present invention relates to power supplies and more specifically to a circuit and method of tracking voltage regulator outputs for a power management unit integrated circuit (PMUIC) to maintain a ratiometric relation between voltage regulator outputs.

BACKGROUND

Power management is one of the most important areas of electronic design. With the proliferation of portable devices and complex, multi-functional integrated circuits, a variety of regulated supply voltages are generally provided to various circuits within a microchip or in a plurality of microchips.

Noise suppression, level control, drop-out control, efficiency are some of the aspects of power supply design taken into consideration. Moreover, highly sensitive modern electronic devices require a high degree of accuracy and control on the part of the power supply. A PMUIC may provide control of power ramp-up and ramp-down for particular circuits, level shifting for digital circuits, programmable supply voltage for circuits that operate in multiple power modes (such as low power operation, stand-by modes), and the like.

Furthermore, a PMUIC may include programmability features coupled with monitoring. For example, charging current of a battery may be monitored and supply voltage varied between slow-charge, fast-charge, and trickle-charge modes. Commonly available PMUIC's provide a plurality of supply voltages that may be managed by external signals or by the PMUIC. Generally, each supply voltage is independent from others.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to tracking and control method and circuit for use in a power management unit integrated circuit (PMUIC) that enables multiple voltage regulator outputs to maintain a same voltage or a ratiometric relation to a reference voltage source. If the reference voltage source is powered down or falls below a prescribed level, the tracking power supplies are automatically switched to their internal bandgap reference voltage. Accordingly, outputs of the tracking power supplies are prevented from introducing large transient excursions that might result in malfunctions in the circuitry of the load such as latch-ups. Ratiometric tracking further provides coordinated preservation of logic interface levels, and reduces leakage current.

The present invention pertains to a method that enables power supply outputs to track each other in regulator integrated circuits, and specifically to PMUICs that are designed to power microprocessor chips. New microprocessors developed by major manufacturers for mobile applications require some programmable and/or fixed supply outputs be tracked to a reference supply output. Depending on an application specification the tracking power supply may need to follow a reference voltage tightly (within a few millivolts), or to ratiometrically follow the reference voltage to a different voltage value within a specified tolerance.

While a preferred embodiment of the present invention may be implemented in a dual associative tracking voltage regulator circuit, the invention is not so limited. The described circuit may be employed as part of virtually any multiple associative tracking voltage regulator circuit known to those skilled in the art.

Figure 1:
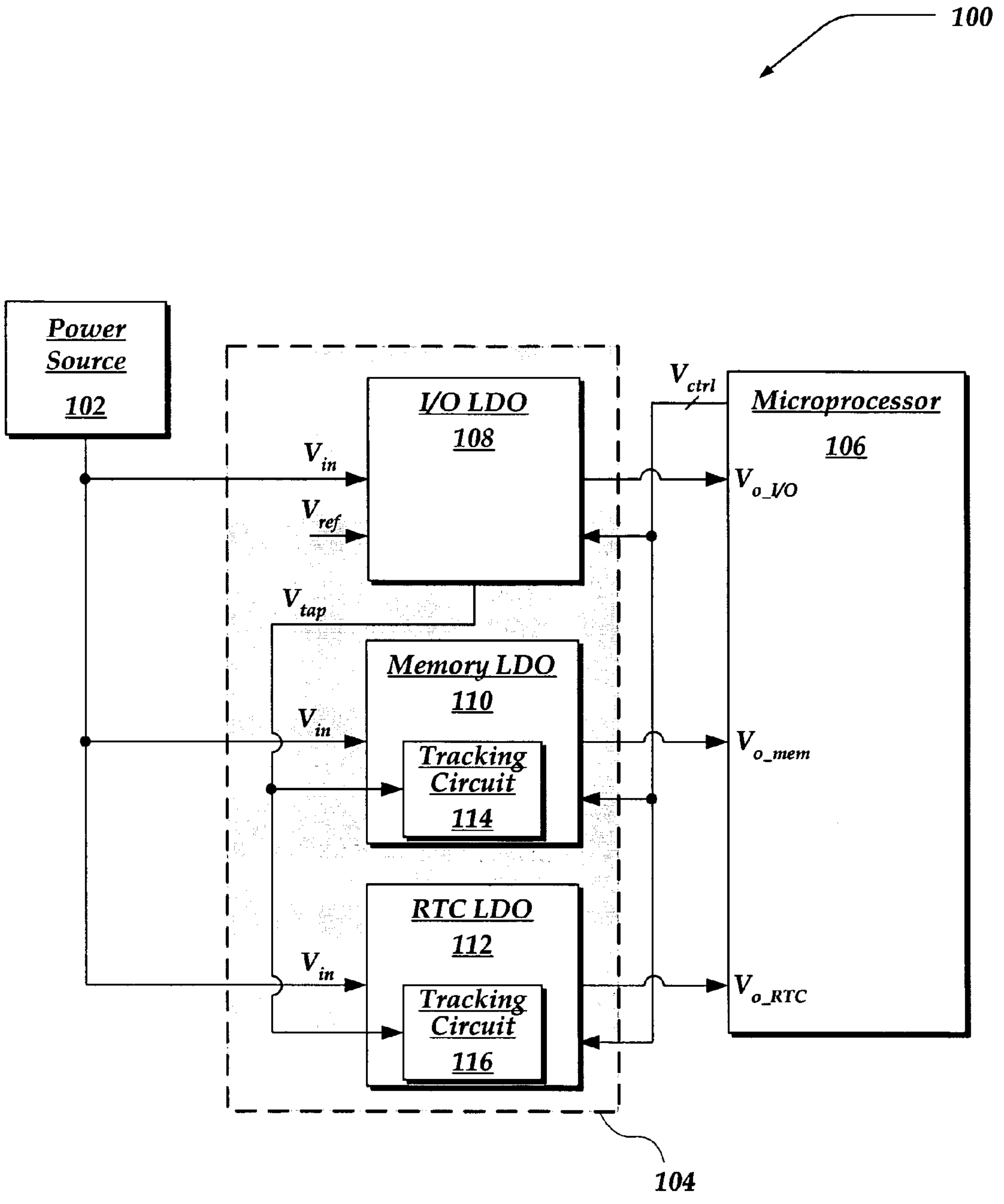
FIG. 1 illustrates a block diagram of a system in which the present invention may be practiced.

FIG. 1 illustrates a block diagram system 100, which is representative of an environment in which the present invention may be practiced. System 100 includes power source 102, PMUIC 104 and microprocessor 106. PMUIC 104 includes Input/Output (I/O) LDO module 108, Memory LDO module 110, and Real Time Clock (RTC) LDO module 112. Memory LDO module 110 and RTC LDO module 112 both include tracking circuits 114 and 116.

Power source 102 may be any device that is arranged to provide power to a circuit. Power source 102 may include a battery, a power adapter such as an AC/DC converter, a DC/DC power converter, and the like.

PMUIC 104 is arranged to receive input voltage $V_{in}$ and to provide a variety of supply voltages such as $V_{o\_I/O}$, $V_{o\_mem}$, $V_{o\_RTC}$, and the like to other circuits such as circuits of a microprocessor. Microprocessor 106 may be a digital signal processor (DSP), an application specific integrated circuit (ASIC), and the like, and include a number of different circuits such as an input/output (I/O) interface circuit, a memory circuit, a real time clock circuit, and the like. In one embodiment, various subcircuits of microprocessor 106 may require same supply voltage, independent supply voltages, and ratiometrically dependent supply voltages. To address an increasing need of tracking supplies in integrated regulators for new microprocessors developed for mobile applications, low-drop out regulators (LDOs) are commonly used with additional functions. Some additional features include regulator output to track to a reference LDO, switching of the reference input between an LDO output and its own internal bandgap voltage, and programmable output via a serial bus interface.

In one embodiment, microprocessor 106, including the I/O circuit, the memory circuit, and the real time clock circuit may receive supply voltages $V_{o\_I/O}$, $V_{o\_mem}$, $V_{o\_RTC}$ from PMUIC 104 to power up the subcircuits.

PMUIC 104 may include I/O LDO regulator 108 to provide $V_{o\_I/O}$ in response to $V_{in}$ and a reference voltage $V_{ref}$. In a tracking operation, I/O LDO regulator 108 may also provide tapping voltage $V_{tap}$ to other regulators of PMUIC 104 such as memory LDO regulator 110 and RTC LDO regulator 112. Memory LDO regulator 110 may include tracking circuit 114, which is arranged to receive $V_{in}$ and $V_{tap}$ and provide $V_{o\_mem}$ in response. Tracking circuit 114 may be arranged to track $V_{o\_I/O}$ based on $V_{tap}$ such that $V_{o\_mem}$ is ratiometrically related to $V_{o\_I/O}$.

Similarly RTC LDO regulator 112 may include tracking circuit 116, which is arranged to receive $V_{in}$ and $V_{tap}$ and provide $V_{o\_RTC}$ in response to power the real time clock circuit of microprocessor 106. Tracking circuit 116 may be arranged to track $V_{o\_I/O}$ based on $V_{tap}$ such that $V_{o\_RTC}$ is ratiometrically related to $V_{o\_I/O}$.

In another embodiment, microprocessor 106 may be arranged to provide a control voltage $V_{ctrl}$ to PMUIC 104 such that $V_{o\_I/O}$, $V_{o\_mem}$, $V_{o\_RTC}$ are controlled based on $V_{ctrl}$. For example, microprocessor 106 may be a charging control device and one of the supply voltages provided by PMUIC 104 may be turned off based on $V_{ctrl}$ to prevent damage to the load under charge.

Figure 2A:
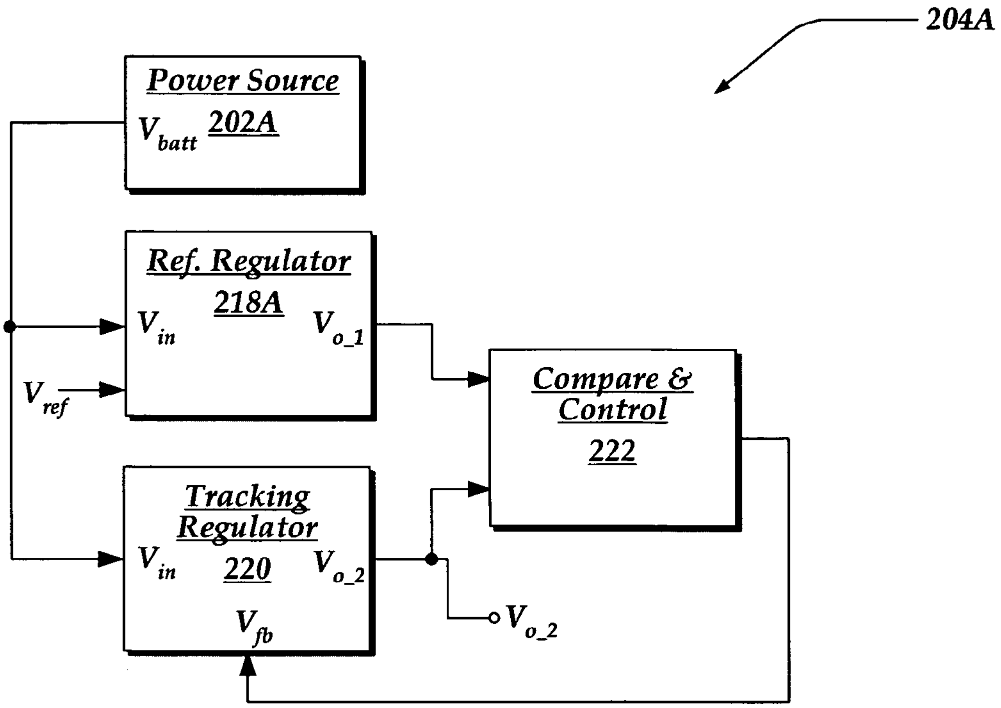
FIGS. 2A and 2B illustrate block diagrams of dual and triple associative tracking power supplies.
Figure 2B:
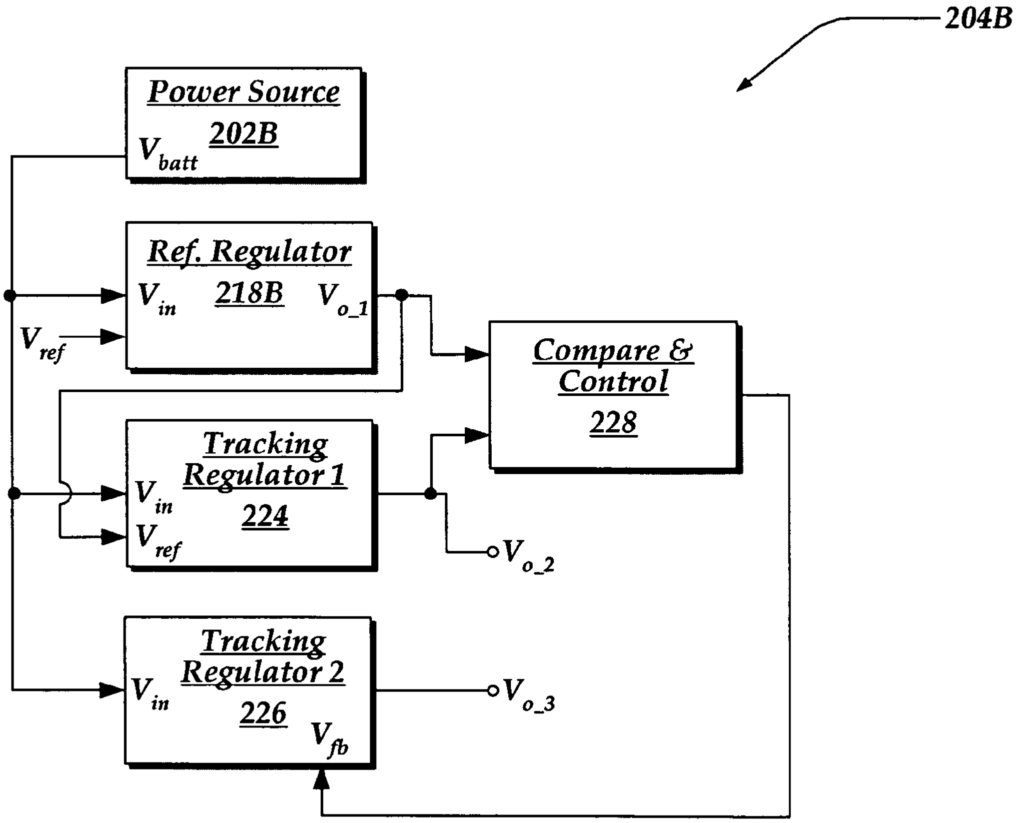

FIGS. 2A and 2B illustrate block diagrams of dual associative tracking power supply 204A and triple associative tracking power supply 204B. Dual associative tracking power supply 204A includes power source 202A, reference regulator 218A, tracking regulator 220, and compare and control circuit 222. Triple associative tracking power supply 204B includes power source 202B, reference regulator 218B, first tracking regulator 224, second tracking regulator 226, and compare and control circuit 228.

Dual associative tracking power supply 204A is arranged to receive input voltage $V_{in}$, which in one embodiment may be battery voltage $V_{batt}$, and provide a first regulated output voltage $V_{o\_1}$ and a second regulated output voltage $V_{o\_2}$, which tracks $V_{o\_1}$. Reference regulator 218A may be arranged to receive $V_{in}$ and reference voltage $V_{ref}$, and to provide $V_{o\_1}$ based on $V_{in}$ and $V_{ref}$. In one embodiment, $V_{ref}$ may be generated by reference regulator 218A internally.

Compare and control circuit 222 may be arranged to receive $V_{o\_1}$ and $V_{o\_2}$ and provide feedback voltage $V_{fb}$ to tracking regulator 220. Compare and control circuit 222 may include a fast comparator, a differential amplifier, and the like.

Tracking regulator 220 may be arranged to receive $V_{in}$ and $V_{fb}$, and provide $V_{o\_2}$ in response to $V_{in}$ and $V_{fb}$ such that $V_{o\_2}$ tracks $V_{o\_1}$. In one embodiment, tracking regulator 220 may further include a bypass circuit that is arranged to switch tracking regulator 220 to an internal bandgap voltage, if reference regulator 218A is disabled or $V_{o\_1}$ drops below a tripping value that is outside a range of acceptable values for $V_{o\_2}$.

A detailed description of dual associative tracking power supply 204A is provide in conjunction with FIG. 3 below, along with a schematic of an exemplary embodiment.

Triple associative power supply 204B is arranged to receive input voltage $V_{in}$, which in one embodiment may be battery voltage $V_{batt}$, and provide a first regulated output voltage $V_{o\_1}$, a second regulated output voltage $V_{o\_2}$, which tracks $V_{o\_1}$, and a third regulated output voltage $V_{o\_3}$, which tracks $V_{o\_2}$. Reference regulator 218B may be arranged to receive $V_{in}$ and reference voltage $V_{ref}$, and to provide $V_{o\_1}$ based on $V_{in}$ and $V_{ref}$ similar to reference regulator 218A.

Tracking regulator 224 may receive $V_{o\_1}$ from reference regulator 218B and employ $V_{o\_1}$ as its reference voltage, thereby providing $V_{o\_2}$ such that $V_{o\_2}$ tracks $V_{o\_1}$. Compare and control circuit 228 may be arranged to receive $V_{o\_1}$ and $V_{o\_2}$ and provide feedback voltage $V_{fb}$ to tracking regulator 226. Compare and control circuit 228 may operate in a substantially similar manner to compare and control circuit 222.

Tracking regulator 226 may be arranged to receive $V_{in}$ and $V_{fb}$, and provide $V_{o\_3}$ in response to $V_{in}$ and $V_{fb}$ such that $V_{o\_3}$ tracks $V_{o\_2}$. Because compare and control circuit provides $V_{fb}$ in response to comparing $V_{o\_1}$ and $V_{o\_2}$, and $V_{o\_2}$ already tracks $V_{o\_1}$, $V_{o\_3}$ thereby tracks $V_{o\_1}$ as well. In one embodiment, $V_{fb}$ may be scaled such that $V_{o\_3}$ is ratiometrically dependent on $V_{o\_2}$. For example, a high value for $V_{o\_1}$ and $V_{o\_2}$ may be 5 V, while a high value for $V_{o\_3}$ is 2.5 V.

In another embodiment, one or both of tracking regulators 226 and 228 may further include a bypass circuit that is arranged to switch the tracking regulator(s) to an internal bandgap voltage, if reference regulator 218B is disabled or $V_{o\_1}$ drops below a tripping value that is outside a range of acceptable values for $V_{o\_2}$ or $V_{o\_3}$.

FIGS. 2A and 2B show a particular arrangement of inputs and outputs of the various components of associative tracking power supplies 204A and 204B. In one embodiment, all of the components of associative tracking power supplies 204A and 204B may be included in the same chip. Alternatively, one or more of the components may be off-chip.

Figure 3:
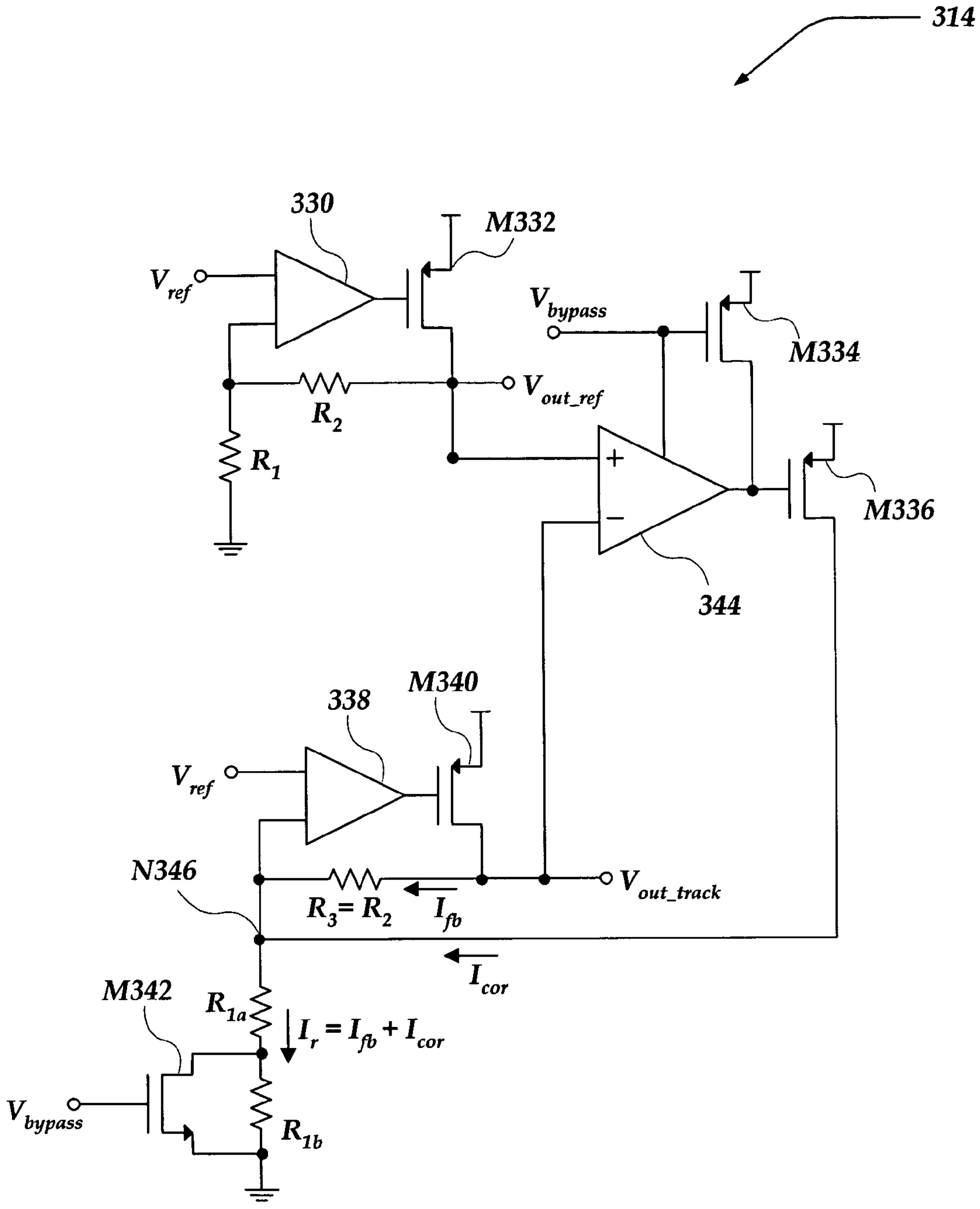
FIG. 3 illustrates a schematic diagram of the dual associative tracking power supply of FIG. 2A.

FIG. 3 illustrates a schematic diagram of dual associative tracking power supply 314. Dual associative tracking power supply 314 is one embodiment of dual associative tracking power supply 204A of FIG. 2A.

Dual associative tracking power supply 314 includes error amplifiers 330 and 338, transistors M332, M334, M336, M340, M342, differential amplifier 344, and resistors $R_1$-$R_3$ and $R_{1a}$, $R_{1b}$. Dual associative tracking power supply 314 includes a feedback mechanism where an amplifier and a control circuit are used to implement the feedback.

Error amplifier 330 is arranged to receive $V_{ref}$ and a feedback voltage provide by a feedback loop comprising resistors $R_1$ and $R_2$, where $R_1$ is coupled between an input of error amplifier 330 and a ground, and $R_2$ is coupled between the same input of error amplifier 330 and a drain of transistor M332. Error amplifier 330 is also arranged to drive a gate terminal of transistor M332. Reference output voltage $V_{out_ref}$ is provided at the drain terminal of transistor M332, which is further coupled to a non-inverting input of differential amplifier 344.

Differential amplifier 344 is arranged to receive tracking output voltage $V_{out\_track}$ at its inverting input and to drive a gate terminal of transistor M336. A drain terminal of transistor M336 is coupled to an input of error amplifier 338 providing correction current $I_{cor}$. Together with transistor M336, differential amplifier 344 provides an error sensing function. A bypass circuit based on $V_{bypass}$ is coupled between a supply terminal of differential amplifier 344 and its output. Transistor M334, which is arranged to receive $V_{bypass}$ and turn on based on $V_{bypass}$, is arranged to short differential amplifier 344 terminating the correction loop.

Second error amplifier 338 is arranged to receive $V_{ref}$ and drive a gate terminal of transistor M340, which is arranged to provide tracking output voltage $V_{out\_track}$ at its drain terminal. A second feedback loop comprising resistors $R_3$, $R_{1a}$, and $R_{1b}$ is arranged similar to the first feedback loop comprising $R_1$ and $R_2$. In one embodiment, $R_3$ may be preselected such that its resistance is substantially equal to a resistance of $R_2$. Feedback current $I_{fb}$ flows from the drain of transistor M340 through $R_3$. At node N346, where resistor $R_{1a}$ is coupled to the input of error amplifier 338 $I_{fb}$ and $I_{cor}$ are added together and flow through $R_{1b}$, which is serially coupled to $R_{1a}$.

A second part of the bypass circuit comprises transistor M342, which is arranged to short $R_{1b}$ based on $V_{bypass}$ provided to a gate terminal of transistor M342.

In an operation, a tracking regulator output is made to track with one or more reference regulator outputs of the same or a ratiometrically dependent voltage. At equilibrium, where the reference and tracking outputs are equal, the error sensing block may issue a nominal control value which causes a nominal correction current either adding to or subtracting from feedback current $I_{fb}$. This results in reference current, $I_r$, remaining at a substantially constant value with respect to reference voltage $V_{ref}$. The basic equations governing the operation may be expressed as:

$$V_{ref}=(I_r+I_{cor})*R_1$$

$$I_r=I_{fb}+I_{cor}$$

This results in:

$$V_{out}=V_{ref}+I_{fb}*R_2$$

$$=V_{ref}+(I_r-I_{cor})*R_2$$

When the $V_{out_ref}$ becomes higher than the $V_{out\_track}$, correction current $I_{cor}$ decreases below nominal and causes $I_{fb}$ to increase, boosting the tracking output. Similarly, when $V_{out_ref}$ becomes lower than the $V_{out\_track}$ the reverse scenario occurs, where $I_{cor}$ increases above nominal, lowering $I_{fb}$ and thereby the tracking output.

Furthermore, if $V_{out_ref}$ skews to some unacceptable level, a bypass control may be set off. This disconnects the tracking mechanism, which removes $I_{cor}$ and shorts out resistor $R_{1b}$. Hence, the tracking regulator(s) returns to its native mode of operation, where its output tracks to its own stable bandgap reference.

FIG. 3 shows an exemplary embodiment of dual associative tracking power supply 314. However, the invention is not so limited. Other arrangements of the same circuit may be implemented without departing from the spirit and scope of the present invention.

Figure 4:
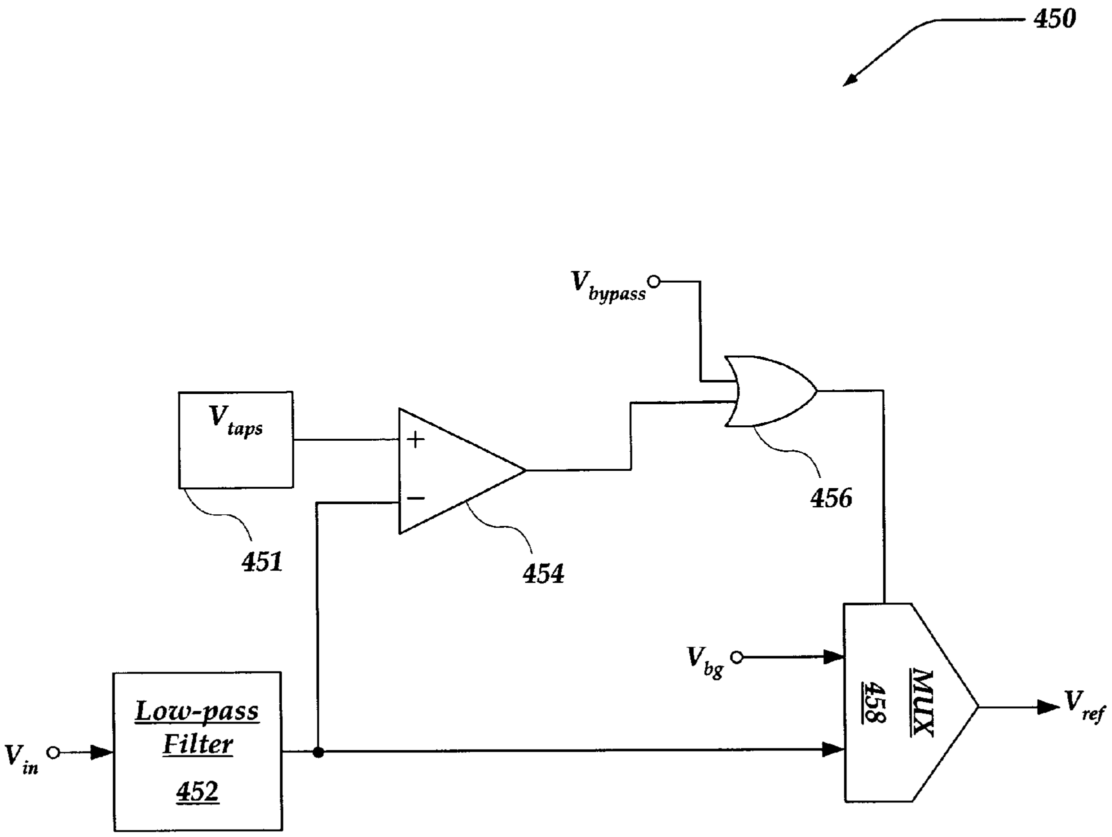
FIG. 4 illustrates an exemplary embodiment of a multiplexing circuit to detect an under voltage, to select a trip point, and to track a reference bypass, which may be employed commonly in the tracking circuits of the PMUIC of FIG. 1.

FIG. 4 illustrates an embodiment of multiplexing circuit 450 that is employed to detect an under voltage, to select a trip point, and to track a reference bypass. Multiplexing circuit 450 may be employed in commonly in tracking circuits 114 and 116 of PMUIC 104 FIG. 1. Multiplexing circuit 450 includes voltage source representing $V_{taps}$ 451, comparator 454, OR operator 456, low-pass filter 452, and multiplexer 458.

$V_{tap}$, from reference LDO may be low pass filtered, ridding noise components, and establish a correct reference level. This tracking reference voltage and an internal bandgap voltage $V_{bg}$ may be multiplexed together at multiplexer 458 before they are provided to a reference voltage input of the tracking LDO regulators. As a result of the multiplexing, if the reference LDO regulator output is powered down or has dropped below a normal operating range, some supplies that power critical functions such as data recording may maintain a nominal output level for as long as input voltage is available to keep data integrity and enable safe power down sequence.

Comparator 454 is arranged to continuously monitor the tapped reference LDO output ($V_{tap}$) and compare it with a user selectable trip point. Thus, tracking bypass may occur when a fault condition is sensed and the tracking LDO regulators switch to their internal bandgap reference. Furthermore, a serial interface may override internal control registers to invoke power down and tracking bypass functions in addition to programming the output voltage of the tracking regulator. This may be accomplished by performing an OR operation between an output of comparator 454 and $V_{bypass}$ provided by the serial interface.

FIG. 4 shows an exemplary embodiment of multiplexing circuit 450. However, the invention is not so limited. Other arrangements of the same circuit may be implemented without departing from the spirit and scope of the present invention.

Figure 5:
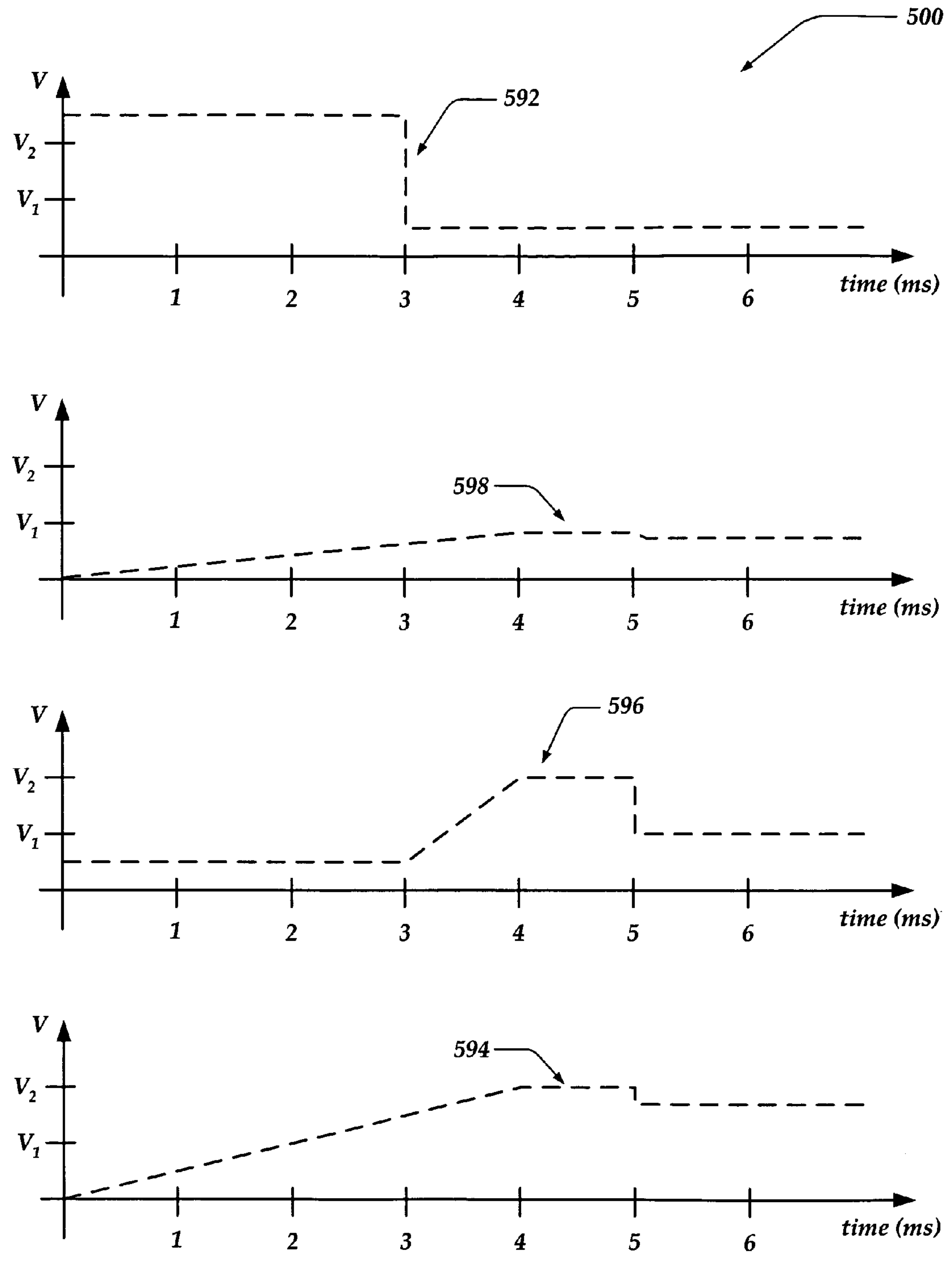
FIG. 5 illustrates a timing diagram of various voltages involved in the PMUIC of FIG. 1.

FIG. 5 illustrates timing diagram 500 of various voltages involved in PMUIC 100 of FIG. 1. Timing diagram 500 includes comparator output voltage 592, reference regulator output voltage 594, tracking LDO output voltage 596, and scaled and low-pass filtered reference regulator output voltage 598.

As shown in the figure, reference regulator output voltage 594 increases linearly until it reaches $V_2$. Subsequently, reference regulator output voltage 594 may drop to a lower value and remain substantially constant at its new value.

Tracking LDO output voltage 596 may be at a substantially constant value until reference regulator output voltage 594 reaches a tripping point as shown by comparator output voltage 592 at 3 ms in this example. Once reference regulator output voltage 594 exceeds the tripping point, tracking LDO output voltage 596 tracks reference regulator output voltage 594 until it reaches $V_2$ as well. When reference regulator output voltage 594 drops to its new value, however, tracking LDO output voltage 596 drops to its predetermined value $V_1$ and remains substantially constant at $V_1$.

If the reference regulator is disabled prior to reaching a tracking threshold, tracking LDO output voltage 596 is switched to using its own bandgap reference voltage. As the reference voltage goes above the tripping point, such as 2.48 V for example, tracking LDO output voltage 596 substantially follows the reference voltage.

Scaled and low-pass filtered reference regulator output voltage 598 may be employed by another tracking LDO regulator to provide a ratiometrically dependent output voltage. Low-pass filtering removes substantially noise components, and scaling provides for ratiometric relation between the second tracking LDO voltage and the reference voltage.

The values for times and voltages provided in the above description are for example purposes only, and do not indicate limitations on any embodiment of the present invention.

The above specification, examples and data provide a description of the manufacture and use of the composition of the invention. Since many embodiments of the invention can be made without departing from the spirit and scope of the invention, the invention also resides in the claims hereinafter appended.

I claim:

1. A power management unit integrated circuit (PMUIC), comprising:

a first voltage regulator circuit that is arranged to receive an input voltage and a reference voltage, and to provide:

a first regulated output voltage based on the input voltage and the reference voltage; and a tapping voltage based on sampling the reference voltage; and at least one additional voltage regulator circuit that is arranged to receive the input voltage and the tapping voltage, and to provide at least one additional regulated output voltage based on the input voltage and the tapping voltage such that the at least one additional regulated output voltage tracks the first regulated output voltage in a ratiometric relation.

2. The circuit of claim 1, wherein the first voltage regulator circuit and the at least one additional voltage regulator circuit are arranged to provide a supply voltage to at least one of a memory circuit, an input/output interface circuit, and a real time clock circuit.

3. The circuit of claim 1, wherein the at least one additional voltage regulator circuit comprises a low drop-out (LDO) voltage regulator circuit.

4. The circuit of claim 1, wherein the PMUIC is arranged to provide a plurality of supply voltages to at least one of a microprocessor, a memory device, and an application specific integrated circuit (ASIC).

5. The circuit of claim 1, wherein the first voltage regulator circuit and the at least one additional voltage regulator circuit are arranged to receive a control voltage such that a regulation of the first regulated output voltage and the at least one additional regulated output voltage are further based on the control voltage.

6. The circuit of claim 1, wherein the ratiometric relation includes a ratio of P/Q between the first regulated output voltage and the at least one additional regulated output voltage, and wherein P and Q are at least one of a positive integer and a negative integer.

7. The circuit of claim 1, wherein the circuit is arranged such that at least one of a latch-up, a leakage current, and an interface logic level conflict is substantially prevented.

8. A tracking power management unit integrated circuit (PMUIC), comprising:

a reference voltage regulator circuit that is arranged to receive an input voltage and a reference voltage, and to provide a first regulated output voltage based on the input voltage and the reference voltage;

a first tracking voltage regulator circuit that is arranged to receive the input voltage and a feedback voltage, and to provide a second regulated output voltage in response to the input voltage and the feedback voltage; and a compare-and-control circuit that is arranged to receive the first regulated output voltage and the second regulated output voltage, and to provide the feedback voltage such that the second regulated output voltage tracks the first regulated output voltage, and such that the feedback voltage is based, at least in part, on the first regulated output voltage.

9. The circuit of claim 8, wherein to accomplish tracking the PMUIC includes a continuous monitoring detect-and-control circuit comprising:

an first amplifier that is arranged to drive a gate terminal of a first transistor, wherein the reference voltage is provided to a first input of the first amplifier;

a first resistor that is coupled between a second input of the first amplifier and a ground; and a second resistor that is coupled between a drain terminal of the first transistor and the second input of the first amplifier, wherein the first regulated output voltage is provided a the drain terminal of the first transistor.

10. The circuit of claim 9, wherein the continuous monitoring detect-and-control circuit further includes:

a second amplifier that is arranged to drive a gate terminal of a second transistor, wherein the reference voltage is provided to a first input of the second amplifier;

a third resistor that is coupled between a second input of the second amplifier and a bypass circuit; and a fourth resistor that is coupled between a drain terminal of the second transistor and the second input of the second amplifier, wherein the second regulated output voltage is provided a the drain terminal of the second transistor, and wherein a resistance of the third resistor is substantially equal to a resistance of the second resistor.

11. The circuit of claim 10, wherein the compare-and-control circuit comprises:

a differential amplifier that is arranged to operate as a comparator, and to receive the first regulated output voltage at a non-inverting input and the second regulated output voltage at an inverting input; and a third transistor that is arranged to receive an output voltage of the differential amplifier at a gate terminal, and to provide a correction current to the second input of the second amplifier.

12. The circuit of claim 11, wherein the continuous monitoring detect-and-control circuit further includes:

a by-pass circuit that is arranged to disable the differential amplifier and to switch the tracking voltage regulator circuit from a reference voltage source to an internal bandgap voltage source.

13. The circuit of claim 12, wherein the by-pass circuit comprises:

a fifth resistor that is coupled between the third resistor and a ground; and a fourth transistor that is arranged to shunt the fifth resistor based on the by-pass voltage provided to a gate terminal of the fourth transistor.

14. The circuit of claim 12, wherein the by-pass circuit comprises:

a low-pass filter that is arranged to receive the input voltage and provide a filtered input voltage;

a differential amplifier that is arranged to receive the filtered input voltage and a tapping voltage, and to provide an error voltage;

an OR operator that is arranged to receive the error voltage and the by-pass voltage, and to provide a by-pass tracking voltage based on an OR operation between the error voltage and the by-pass voltage, and to provide a by-pass tracking voltage; and a multiplexer that is arranged to receive an internal bandgap voltage and the filtered input voltage, and provide the reference voltage based on multiplexing the internal bandgap voltage and the filtered input voltage.

15. The circuit of claim 11, wherein the continuous monitoring detect-and-control circuit is arranged to compare a scaled version of the first regulated output voltage and a scaled version of the second regulated output voltage employing a voltage divider circuit.

16. A tracking power management unit integrated circuit (PMUIC), comprising:

a reference voltage regulator circuit that is arranged to receive an input voltage and a reference voltage, and to provide a first regulated output voltage based on the input voltage and the reference voltage;

a first tracking voltage regulator circuit that is arranged to receive the input voltage and the first regulated output voltage, and to provide a second regulated output voltage in response to the input voltage and first regulated output voltage;

a compare-and-control circuit that is arranged to receive the first regulated output voltage and the second regulated output voltage, and to provide a feedback voltage; and a second tracking voltage regulator circuit that is arranged to receive the input voltage and the feedback voltage, and to provide a third regulated output voltage in response to the input voltage and the feedback voltage.

17. The circuit of claim 16, further comprising:

at least one additional tracking voltage regulator circuit that is arranged to receive the input voltage and the feedback voltage, and to provide at least one additional regulated output voltage in response to the input voltage and the feedback voltage.

18. A method for providing two regulated voltages, comprising:

receiving an input voltage and a reference voltage;

providing a first regulated output voltage based, in part, on the input voltage and the reference voltage;

providing a feedback voltage based, in part, on comparing the first regulated output voltage and a second regulated output voltage;

providing the second regulated output voltage based, in part, on the input voltage and the feedback voltage, wherein the second regulated output voltage tracks the first regulated output voltage with a ratiometric relation.

19. The method of claim 18, wherein providing the feedback voltage comprises:

providing a first reference output voltage from a first error amplifier;

providing a second reference output voltage from a second error amplifier;

comparing the first reference output voltage and the second reference output voltage; and providing the feedback voltage to the second error amplifier based on the comparison.

20. A method for providing a plurality of regulated voltages, comprising:

receiving an input voltage and a reference voltage;

providing a first regulated output voltage based, in part, on the input voltage and the reference voltage;

providing a second regulated output voltage based, in part, on the input voltage and the first regulated output voltage, wherein the second regulated output voltage tracks the first regulated output voltage with a ratiometric relation;

providing a first feedback voltage based, in part, on comparing the first regulated output voltage and a second regulated output voltage;

providing a third regulated output voltage based, in part, on the input voltage and the first feedback voltage, wherein the third regulated output voltage tracks the first regulated output voltage and the second regulated output voltage with a ratiometric relation;

providing an Nth feedback voltage based, in part, on comparing an Nth regulated output voltage and an (N+1)th regulated output voltage, wherein N is an integer greater than one; and providing an (N+2)th regulated output voltage based, in part, on the input voltage and the Nth feedback voltage, wherein the (N+2)th regulated output voltage tracks the Nth regulated output voltage and the (N+1)th regulated output voltage with a ratiometric relation.

* * * * *

UNITED STATES PATENT AND TRADEMARK OFFICE

CERTIFICATE OF CORRECTION

PATENT NO. : 7,274,114 B1
APPLICATION NO. : 10/989131
DATED : September 25, 2007
INVENTOR(S) : Wong It is certified that error appears in the above-identified patent and that said Letters Patent is hereby corrected as shown below:

On the face page, in field (56), under "Other Publications", in column 2, line 1, delete "Singel" and insert -- Single --, therefor.

In column 5, line 9, delete "$V_{ref}$and" and insert -- $V_{ref}$ and --, therefor.

In column 5, line 49, delete "if$V_{out_ref}$skews" and insert -- if $V_{out_ref}$ skews --, therefor.

In column 8, line 12, in Claim 9, delete "a the" and insert -- at the --, therefor.

In column 8, line 23, in Claim 10, delete "a the" and insert -- at the --, therefor.

Signed and Sealed this

Eleventh Day of December, 2007

JON W. DUDAS

*Director of the United States Patent and Trademark Office*